United States Patent
Yoshinari et al.

Patent Number: 5,513,279
Date of Patent: Apr. 30, 1996

[54] IMAGE CODING AND DECODING APPARATUS WITH CODED DATA SIZE INFORMATION PROVIDED CODED DATA BLOCKS

[75] Inventors: Toshiaki Yoshinari; Kazuhiro Suzuki; Taro Yokose; Ken Umezawa, all of Ebina, Japan

[73] Assignee: Fuji Xerox Co., Ltd., Tokyo, Japan

[21] Appl. No.: 264,372

[22] Filed: Jun. 23, 1994

[30] Foreign Application Priority Data

Sep. 8, 1993 [JP] Japan .................... 5-223607

[51] Int. Cl.⁶ .................... G06K 9/36
[52] U.S. Cl. .................... 382/232; 358/426
[58] Field of Search .................... 382/56, 232, 233, 382/235, 239; 358/404, 426, 430, 433, 539; 348/420; H04N 1/415

[56] References Cited

U.S. PATENT DOCUMENTS

| | | | |
|---|---|---|---|
| 5,249,066 | 9/1993 | Fukuda et al. | 358/433 |
| 5,299,018 | 3/1994 | Jefferson | 358/261.1 |
| 5,303,058 | 4/1994 | Fukuda et al. | 358/261.1 |
| 5,408,542 | 4/1995 | Callahan | 382/56 |

OTHER PUBLICATIONS

"Digital Compression and Coding of Continuous-Tone Still Images;" Part I and Annex B; International Standard DIS 10918-1.

*Primary Examiner*—Leo Boudreau
*Assistant Examiner*—Andrew W. Johns
*Attorney, Agent, or Firm*—Oliff & Berridge

[57] ABSTRACT

An image coding and decoding apparatus to improve processing speed in searching for marker information such as control information when decoding, reduce the capacity of memory means for expanding compressed data and reduce the size of the unit of coding and decoding processing is disclosed, wherein divided coded data blocks CodeBlock 1-1, 1-2 and so forth are produced by dividing coded data obtained by coding image data for an image of a predetermined size into a predetermined size and control information values CodeSize1-1, 1-2 and so forth showing coded data block size are appended to each divided coded data block as control information.

4 Claims, 10 Drawing Sheets

IMAGE CODING AND DECODING APPARATUS WITH CODED DATA SIZE INFORMATION PROVIDED CODED DATA BLOCKS

FIELD OF THE INVENTION

The present invention relates to an image coding and decoding apparatus for a still image.

BACKGROUND OF THE INVENTION

Figure 10:
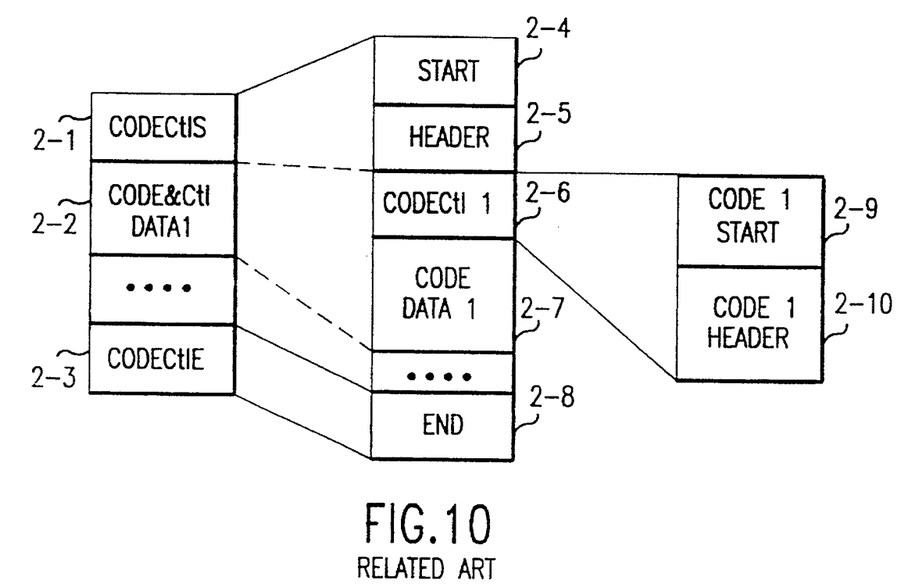
FIG. 10 shows the structure of the coded data of Conventional Embodiment 1.

For a compression method for coding a still image to transmit or store it, the standard one called the JPEG (Joint Photographic Expert Group) method is known. As shown in FIG. 10, other than coded data CodeData1 (2-7) obtained by coding image data in predetermined units, for example, units represented in a predetermined color parameter, compressed data used in JPEG comprises control information such as:

start marker information for the compressed data Start (2-4);

end marker information End (2-8) or header information Header (2-5);

start marker information Code1Start (2-9) of the compressed data Code&Ct1Data1 (2-2) in a predetermined unit; and header information Code1Header (2-10).

A color space is represented by the combination of the above described parameters. In FIG. 10, 2-1 is start control information CodeCt1S for the whole compressed data, 2-3 is end control information CodeCt1E for the whole compressed data, and 2-6 is start control information CodeCt11 of compressed data for the color parameter unit. In the present specification, the control information such as header information and reserve code necessary for transferring coded data obtained by coding image data or controlling the decoding process when decoding the coded data is referred to as marker information, and the coded data including such control information (marker) is referred to as compressed data.

As described in International Standard Dis10918-1, the length of the control information is predetermined, or even if it is variable, as it comprises control data itself and size information for the control data, its size is easily checked. On the other hand, the coded data CodeData1 (2-7) coded by a variable-length coding method does not include size information for the coded data CodeData1 (2-7) itself.

Therefore, it is difficult to check for the end of the first coded data CodeData1 (2-7), start or end of control information or other coded data which follows the first coded data CodeData1 (2-7).

Figure 11:
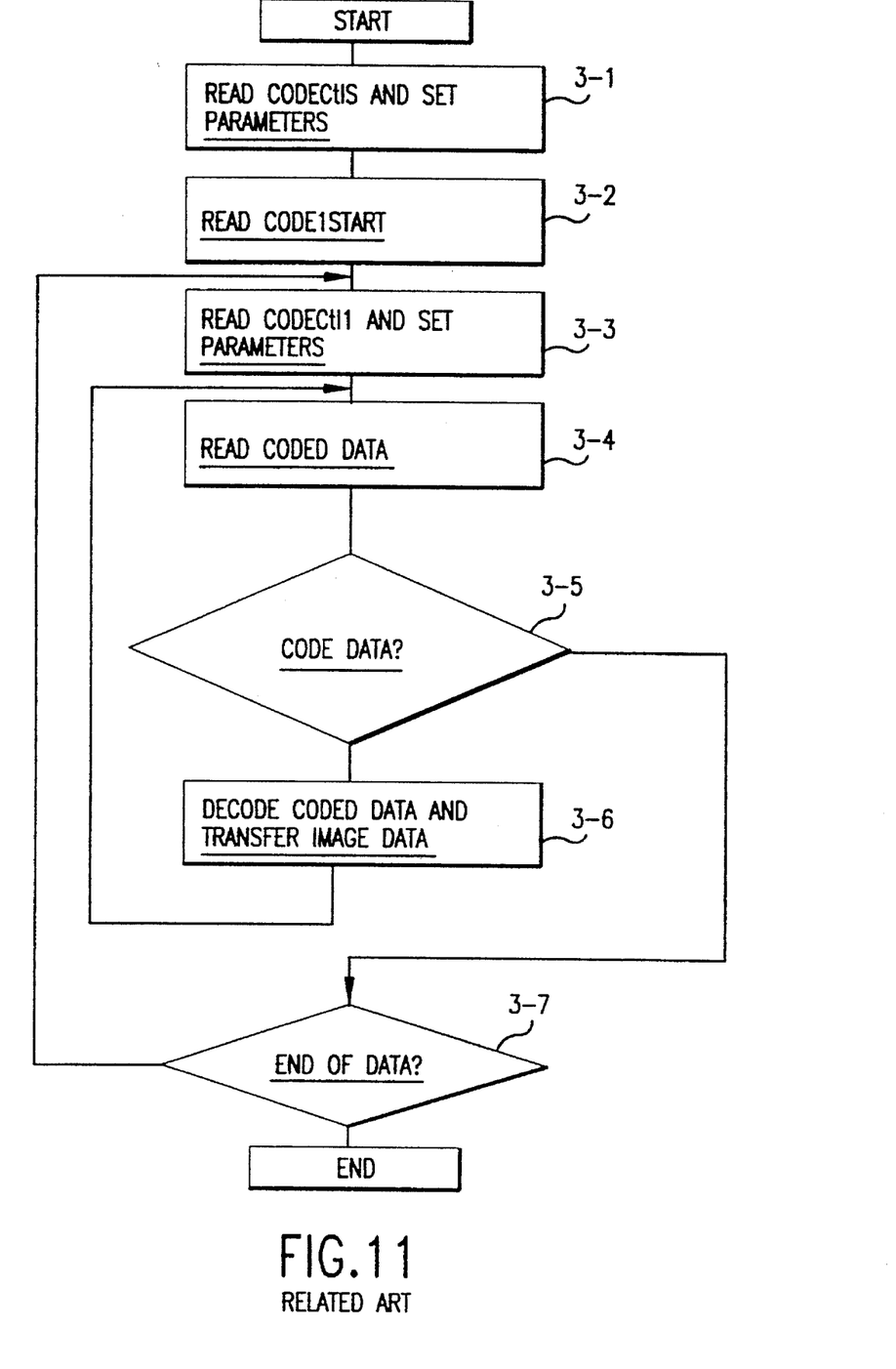
FIG. 11 shows decoding steps of Conventional Embodiment 1.

To extract the coded data CodeData1 (2-7) from the compressed data, as shown by the decoding steps of the conventional example 1 in FIG. 11, it is necessary to parse the control information by reading the control information CodeCt1S (2-1) and CodeCt11 (2-6) from the compressed data expanded in a coded data memory means, set parameters for the coding and decoding means in accordance with the parsed result as shown in steps 3-1, 3-2 and 3-3, read the coded data CodeData1 (2-7), decode it and transfer the image as shown in steps 3-4 and 3-6. In addition to these steps, it is also necessary to separate the coded data from the control information as shown in step 3-5 by comparing the coded data CodeData1 (2-7) with the control information of the next color parameter, for example, Code1Start (2-9) in predetermined units such as bytes. This comparison is repeated until the end marker information End (2-8) has been found as shown in step 3-7.

2

To repeat such data comparisons to separate the coded data from the control information, however, reduces the processing speed.

Figure 12:
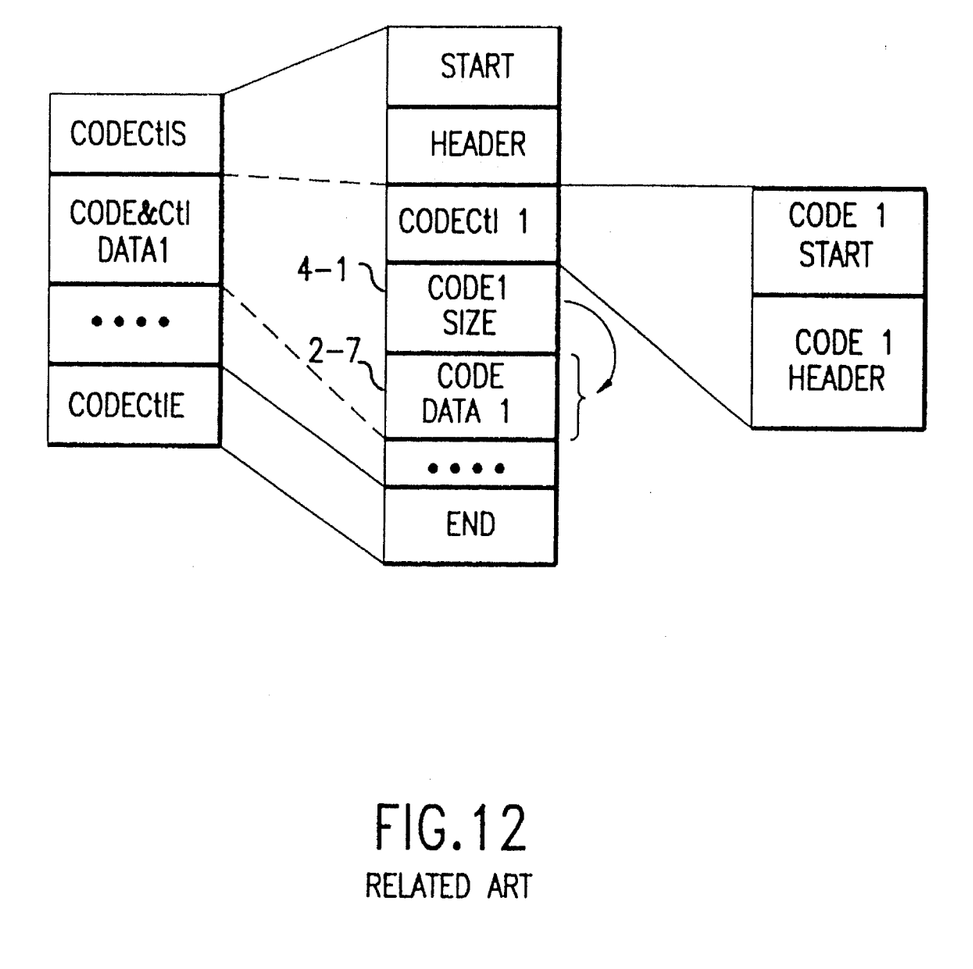
FIG. 12 shows the structure of the coded data of Conventional Embodiment 2.

To omit the processes for the above described comparisons and separation for coded data and control information when decoding, as described in Japanese unexamined patent application Hei 5-37016 (1993) by the inventors of the present invention and shown in FIG. 12, the size of CodeData1 (2-7) can be written by providing coded data size information Code1Size (4-1) before the coded data CodeData1 (2-7), which is obtained by coding image data represented in a predetermined color parameter. With this size information Code1Size (4-1), it is possible to extract CodeData1 (2-7) without the processes for comparisons and separation when decoding.

With the omission of the processes for comparisons and separation when decoding, the time necessary for storing a received coded image data temporarily in a memory and processing the coded image data stored in this memory is reduced, and thus high speed processing is possible.

Figure 13:
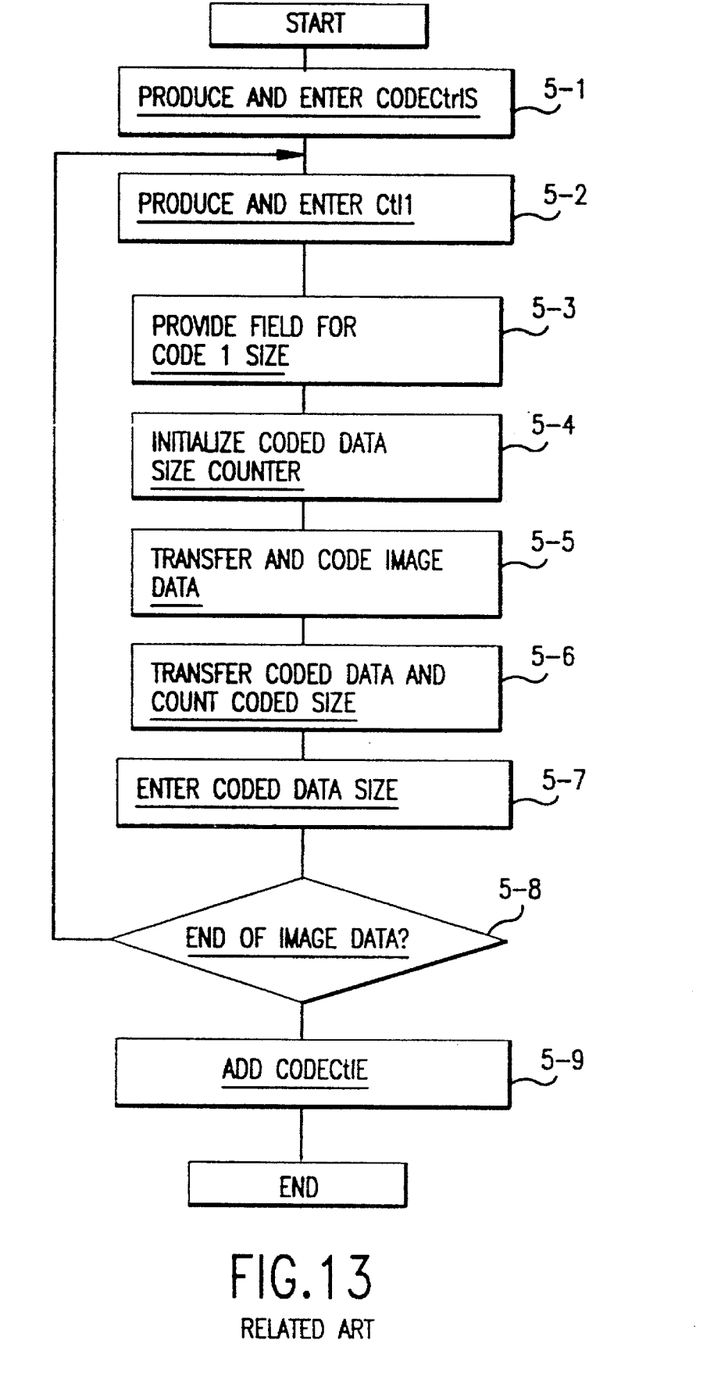
FIG. 13 shows coding steps of Conventional Embodiment 2.

With the provision of the coded data size information Code1Size (4-1), however, as shown by the coding steps in FIG. 13, the processing comprises the following complicated steps:

producing and entering CodeCt1S as shown in step 5-1;

producing and entering CodeCt11 as shown in step 5-2;

providing a field to store the size information Code1Size (4-1) as shown in step 5-3;

initializing a coded data size counter as shown in step 5-4;

transferring and coding the image data represented in a predetermined color parameter as shown in step 5-5;

transferring the coded data for the predetermined color parameter and counting the coded data size as shown in step 5-6;

and entering the coded data size in the Code1Size field as shown in step 5-7.

The above described steps 5-1 to 5-7 are repeated until the end of the image data as shown in step 5-8, and after the processing for the whole image data is completed, end control information CodeCt1E is added as shown in step 5-9.

In the above described coding steps in FIG. 13, in order to write the size of corresponding CodeData1 (2-7), CodeData1 (2-7) coded by the coding process (steps 5-5 and 5-6) must be stored temporally in the coded data memory means, by which the memory capacity of the coded data memory means is inevitably increased. Further, if the processing is to be pipelined, there are inevitably restrictions on the degree to which processing can be divided into small units. Here, the processing unit is the size of a block of data for a single operation of coding and transferring, which is repeated, and if the processing unit is large, the time and memory capacity necessary for a single operation is increased.

SUMMARY OF THE INVENTION

It is an object of the present invention to provide an image coding and decoding apparatus for a still image capable of high speed processing when searching for marker information such as control information when decoding.

It is another object of the present invention to provide an image coding and decoding apparatus for a still image capable of reducing the capacity of a memory means to expand compressed data.

It is a further object of the present invention to provide an image coding and decoding apparatus for a still image capable of dividing the processes for coding and decoding into smaller units.

The image coding and decoding apparatus according to the present invention comprises:

image data memory means for storing image data temporarily;

coding and decoding means for carrying out a coding process to obtain coded data by coding image data and a decoding process to obtain image data by decoding the coded data; coded data memory means for storing temporarily coded data and control information necessary for transferring the coded data or controlling the decoding process when decoding the coded data;

external device connection means for connecting the image coding and decoding apparatus with external devices which actually transfer and store data;

a coded data size counter for counting the coded data size processed by the coding and decoding means;

and control means for transferring data among the coding and decoding means, image data memory means, coded data memory means and external device connection means, producing for and parsing the control information for the coded data, for adding the control information to the coded data, for extracting the control information from the coded data and for setting parameters necessary for the operation of the coding and decoding means, and the control means comprises coded data dividing means for dividing the coded data into some appropriate size to produce divided coded data blocks and coded data size information addition means for appending to each divided coded data block, when coding image data, control information showing the size of the coded data blocks as the control information.

Figure 1:
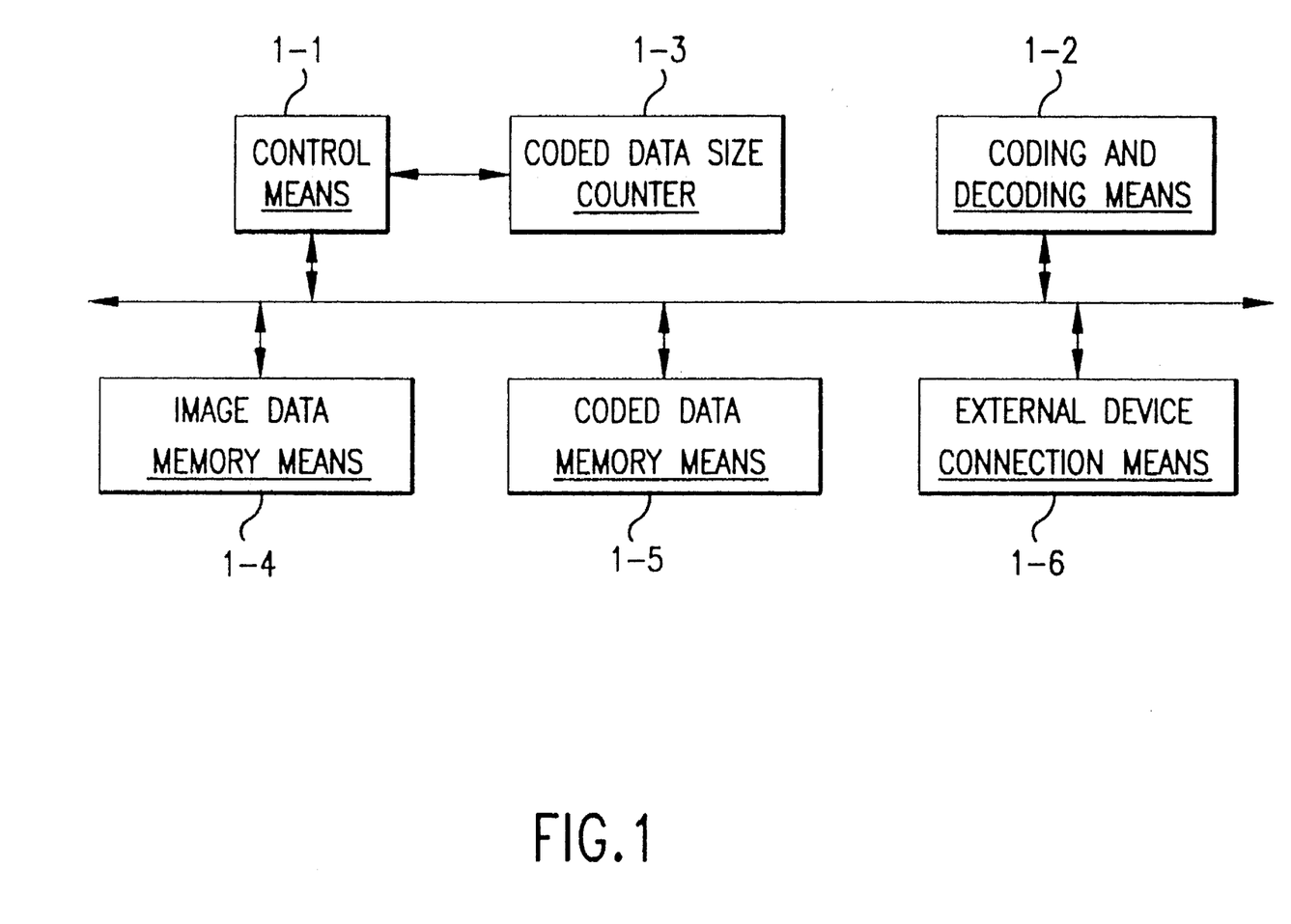
FIG. 1 is a schematic diagram of the image coding and decoding apparatus according to the present invention.

The present invention is now described referring to FIG. 1.

FIG. 1 is a schematic block diagram of the image coding and decoding apparatus according to the present invention. The image coding and decoding apparatus according to the present invention comprises: image data memory means 1-4 for storing image data temporarily;

coded data memory means 1-5 for storing compressed data partially and temporarily;

external device connection means 1-6 for connecting the image coding and decoding apparatus with the external devices which actually transfer and store data; image coding and decoding means 1-2 for coding image data and decoding the coded data;

a coded data size counter 1-3 for counting the size of the coded data processed by the coding and decoding means 1-2; and control means 1-1 for transferring data among the coding and decoding means 1-2, image data memory means 1-4, coded data memory means 1-5 and external device connection means 1-6, for producing and parsing the control information for the coded data, for adding the control information to the coded data, for extracting the control information from the coded data and setting necessary parameters for the coding and decoding means 1-2.

The operation of the image coding and decoding apparatus according to the present invention is now described.

First, the operation when coding is described. The control means 1-1 transfers the image data stored in the image data memory means 1-4 to the coding and decoding means 1-2, coding process is applied to the image data by the coding and decoding means 1-2 and then coded data is obtained.

The control means 1-1 then expands the coded data thus obtained in the coded data memory means 1-5, adds control information to the coded data and produces compressed data. Meanwhile, the coded data size counter 1-3 counts the size of the produced coded data. Further, the control means 1-1 transfers the produced compressed data to the external device connection means 1-6.

In the first example of the above described coding process, if the value of the coded data size counter 1-3 reaches a predetermined value, the size of the coded data is written to the compressed data stored in the coded data memory means 1-5 as control information and it is transferred to the external device connection means 1-6 as a part of the compressed data.

In the second example of the above described coding process, the compressed data stored in the coded data memory means 1-5 is transferred to the external device connection means 1-6, and when the coding process is completed, the coded data size obtained by counting by the coded data size counter 1-3 is made into control information, added to the coded data and then transferred to the external device connection means 1-6.

The operation when decoding is now described. The control means 1-1 expands the compressed data received from the external device connection means 1-6 in the coded data memory means 1-5 and parses the control information of the compressed data. Meanwhile, the control means 1-1 extracts the coded data in accordance with the coded data size written in the control information and transfers only the coded data to the coding and decoding means 1-2. Decoding process is applied to the coded data by the coding and decoding means 1-2, image data is obtained and the obtained image data is expanded in the image data memory means 1-4.

In the first example of the above described decoding process, a part of the compressed data is expanded in the coded data memory means 1-5 and the coded data blocks corresponding to the coded data size information provided successively from the beginning of the compressed data with the corresponding coded data blocks appended to them are extracted, and the decoding process is repeated block by block.

In the second example of the above described decoding process, the whole compressed data is expanded in the coded data memory means 1-5 and the coded data size is determined by the control information provided after the compressed data, and the decoding process is carried out by extracting the coded data in accordance with the coded data size.

DETAILED DESCRIPTION OF THE INVENTION

Embodiments of the present invention is now described based on each of the process steps shown in FIGS. 2, 3, 4 and 5, referring to compressed data of a color still image divided into separate color parameters. For an image coding and decoding apparatus, one having the structure shown in FIG. 1 is used.

EMBODIMENT 1

(CODING PROCESS OF EMBODIMENT 1)

Figure 2:
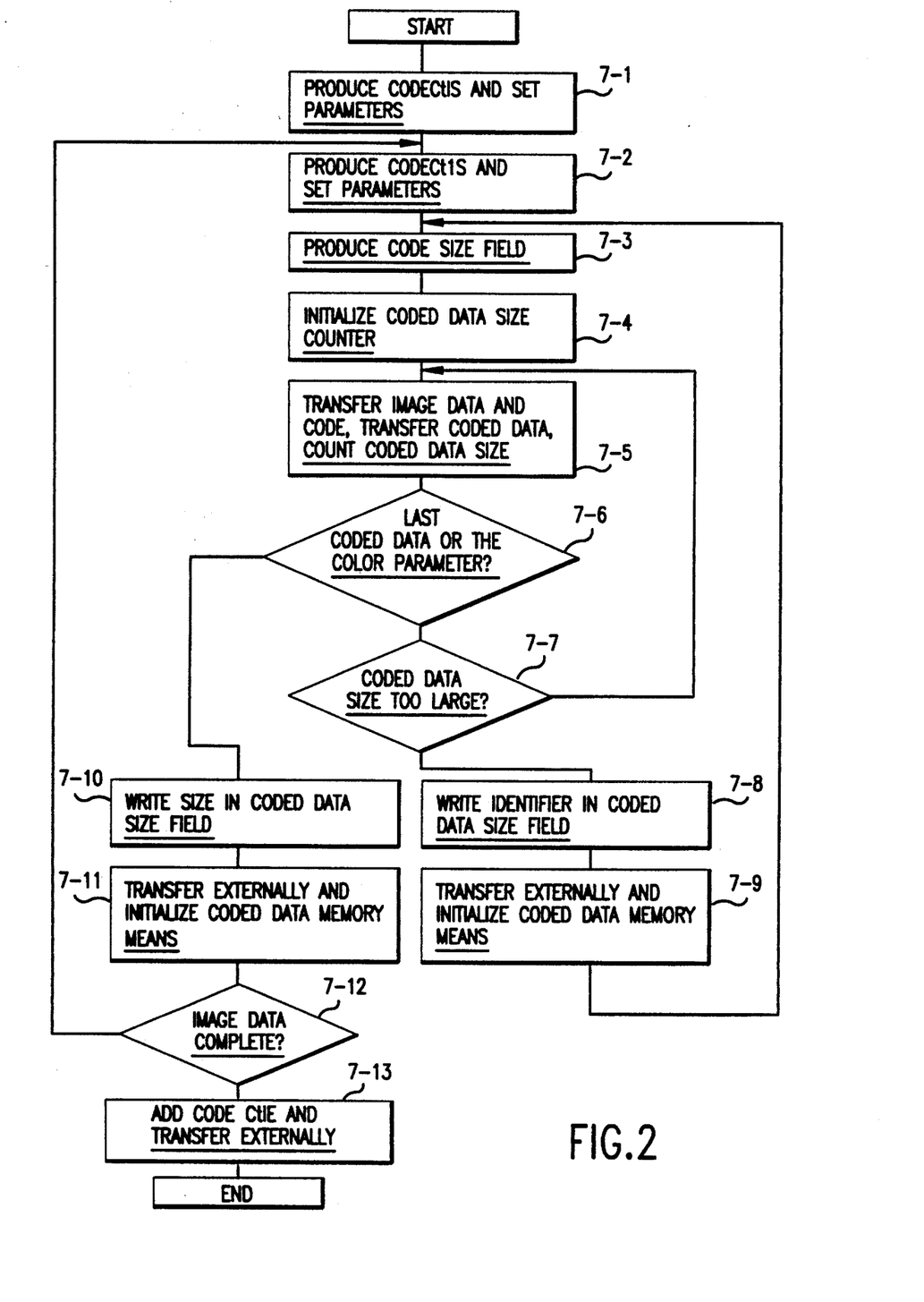
FIG. 2 shows coding steps described in Embodiment 1.
Figure 6:
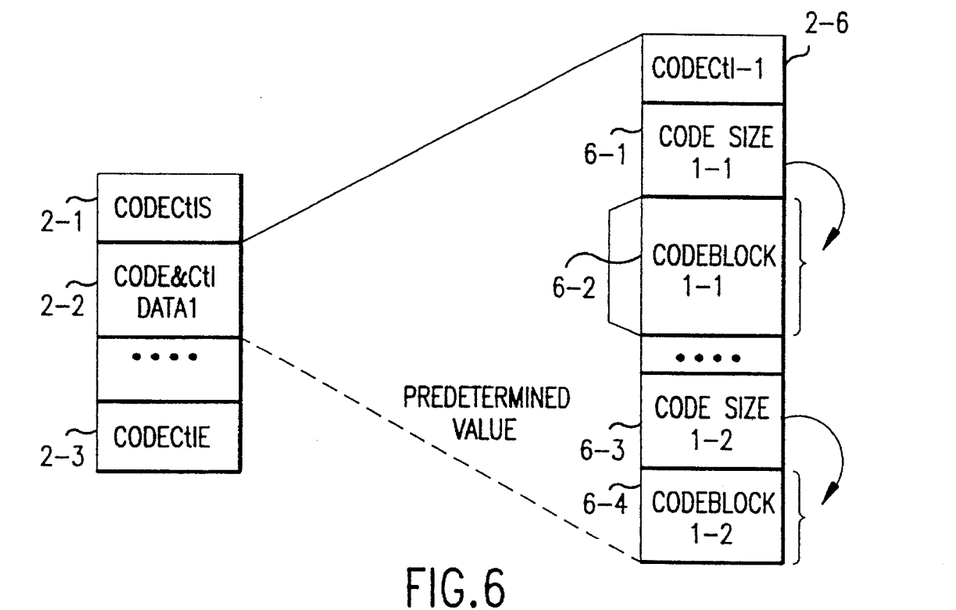
FIG. 6 shows an example of the structure of the coded data of Embodiment 1.

The process for producing a data structure wherein control information to show the size of divided coded data blocks is provided before each of the corresponding divided coded data blocks as shown in FIG. 6, is now described based on the coding steps shown in FIG. 2 as an example of the present invention. Control means 1-1 produces start control information CodeCt1S (2-1) including Start (2-4) and Header (2-5) as shown in FIG. 10, and expands it in coded data memory means 1-5. Meanwhile, it sets the parameters necessary for the coding process for coding and decoding means 1-2 as shown in step 7-1. Further, the control means 1-1 produces the control information CodeCt11 (2-6) including Code1Start (2-9) and Code1Header (2-10) as shown in FIG. 10 and included in the compressed data Code&Ct1Data1 (2-2), and it expands it in the coded data memory means 1-5. Meanwhile, it sets the necessary parameters for the coding and decoding means 1-2 as shown in step 7-2.

Figure 7:
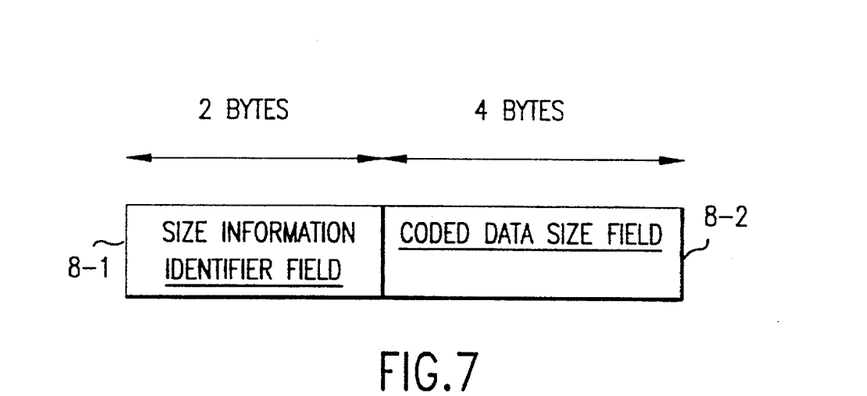
FIG. 7 shows an example of the coded data size information of Embodiment 1.
Figure 8:
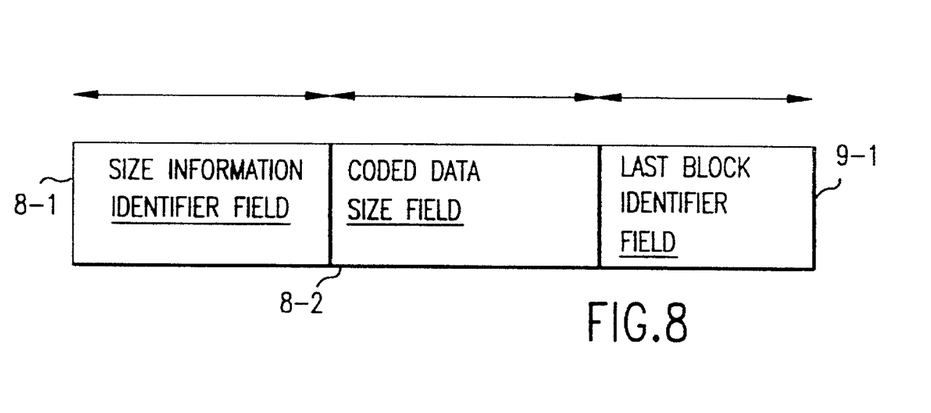
FIG. 8 shows another example of the coded data size information of Embodiment 1.

The control means 1-1 produces a field for the coded data size information CodeSize 1-1 (6-1) showing the size of the coded block CodeBlock1-1 (6-2) obtained by dividing the coded data obtained by coding an image represented in the color parameter into some appropriate size, for example, a size corresponding to the memory capacity of the coded data memory means 1-5, expands it in the coded data memory means 1-5 as shown in step 7-3 and initializes the size of the coded data held by the coded data size counter 1-3 as shown in step 7-4. FIGS. 7 and 8 show examples of coded data size information (6-1 and 6-3). Each of the sets of coded data size information (6-1 and 6-3) comprises a size information identifier field (8-1) which definitively identifies the field for the coded data size information (6-1 and 6-3) among coded data or control information and a coded data size field (8-2) in which the size of the coded block is written. In addition to this, the example shown in FIG. 8 also comprises a last block identifier field (9-1) which shows whether the block is the last of a plurality of blocks obtained from the image data of a predetermined unit. In the example shown in FIG. 7, as the coded data size information does not include a last block identifier field (9-1), the data size for the last coded block only is written in the coded data size field (8-2), and taking advantage of the point that the other blocks do not include data size information, identifiers to indicate intermediate blocks (i.e. blocks other than the last block) are written.

The control means 1-1 transfers the image data stored in the image data memory means 1-4 to the coding and decoding means 1-2. The coding and decoding means 1-2 applies a coding process to the transferred image data. The control means 1-1 then adds the coded data produced in the coding process after the CodeSize1-1 (6-1) stored in the coded data memory means 1-5. Here, the coded data size counter 1-3 counts the size of the produced coded data as shown in step 7-5.

The control means 1-1 confirms that the coded data it transferred is not the last one for the color parameter as shown in step 7-6 and then compares the coded data size held by the coded data size counter 1-3 with the predetermined value as shown in step 7-7. If the size of the coded block CodeBlock 1-1 (6-2) does not reach the predetermined value, the above described steps 7-5 to 7-7 are repeated.

If the size of the coded block CodeBlock1-1 (6-2) matches the predetermined value, the control means 1-1 writes in the coded data size field (8-2) of the CodeSize1-1 (6-1) field an identifier showing that CodedBlock1-1 (6-2) reaches the predetermined value and is an intermediate coded block for the color parameter as shown in step 7-8. In the example shown in FIG. 8, the size is written in the coded data size field (8-2) and the identifier for the intermediate coded block is written in the last block identifier field (9-1). The control means 1-1 transfers the compressed data stored in the coded data memory means 1-5 to the external device connection means 1-6 and then initializes the coded data memory means 1-5 as shown in step 7-9. The above described steps 7-3 to 7-9 are repeated until the last coded block appears.

On the other hand, when the control means 1-1 transfers the last coded block CodeBlock1-2 (6-4) for the color parameter to the coded data memory means 1-5, the control means 1-1 writes the size of the last coded block CodeBlock 1-2 (6-4) in the coded data size field (8-2) of the coded data size information CodeSize 1-2 (6-3) field as shown in step 7-10. In the example shown in FIG. 8, in addition to this, the identifier for the last block is also written in the last block identifier field (9-1). The control means 1-1 then transfers the compressed data stored in the coded data memory means 1-5 to the external device connection means 1-6, and initializes the coded data memory means 1-5 as shown in step 7-11.

The above described steps 7-2 to 7-12 are repeated until the end of the whole image data. Completing the coding process of the image data, the control means 1-1 adds control information CodeCt1E (2-3) to the compressed data stored in the coded data memory means 1-5, transfers the compressed data with the control information to the external device connection means 1-6 as compressed data, and thus the coding process is completed as shown in step 7-13.

Compressed data having the structure shown in FIG. 6 is produced by the above described coding steps.

(DECODING PROCESS OF EMBODIMENT 1)

Figure 3:
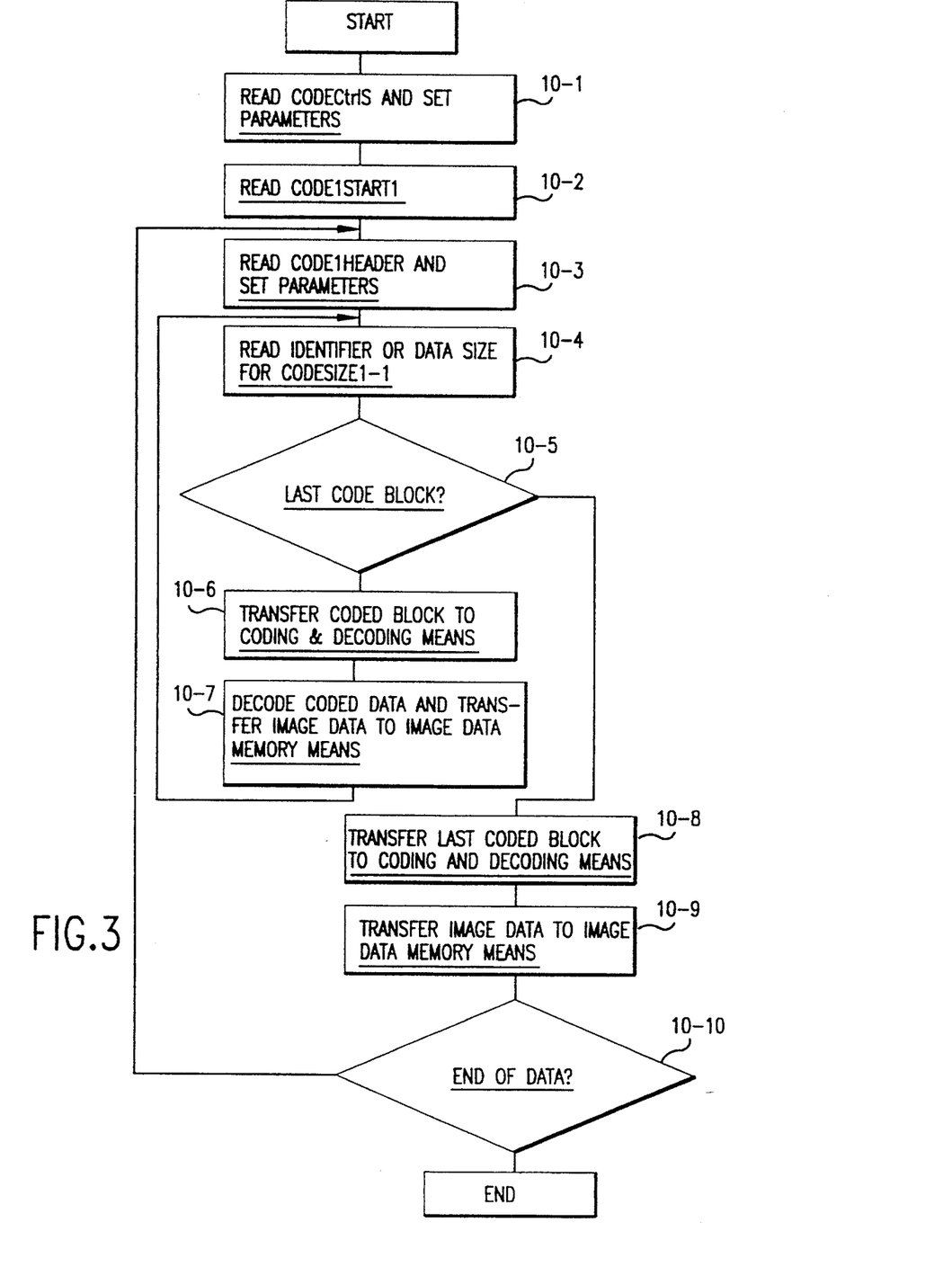
FIG. 3 shows decoding steps described in Embodiment 1.

The decoding process of compressed data having the data structure as shown in FIG. 6 is now described, based on FIG. 3. The control means 1-1 expands the compressed data obtained from the external device connection means 1-6 in the coded data memory means 1-5, reads the CodeCt1S (2-1) stored in the coded data memory means 1-5 and sets the parameters necessary for decoding for the coding and decoding means 1-2 as shown in step 10-1. The control means 1-1 then reads Code1Start (2-9) and Code1Header (2-10)

included in the compressed data for the color parameter, stored in the coded data memory means 1-5 and shown in FIG. 10, and it sets the necessary parameters to the coding and decoding means 1-2 as shown in steps 10-2 and 10-3.

Further, the control means 1-1 extracts CodeSize1-1 (6-1) stored in the coded data memory means 1-5 and reads the identifier or data size entered in the coded data size field (8-2) for the CodeSize 1-1 (6-1) as shown in step 10-4, by which the size of the corresponding coded block is known and whether the coded block is the last coded block Code-Block 1-2 (6-4) for the predetermined color parameter or not is determined as shown in step 10-5.

If the coded block is not the last one, the control means 1-1 transfers the corresponding coded block CodeBlock1-1 (6-2) of a predetermined size from the coded data memory means 1-5 to the coding and decoding means 1-2, and the control means 1-1 transfers the image data decoded by the coding and decoding means 1-2 to the image data memory means 1-4. The above described steps 10-4 to 10-7 are repeated until the last coded block appears.

On the other hand, if the coded block is the last one, the control means 1-1 reads the size of the coded data size field (8-2) and transfers the last coded block CodeBlock1-2 (6-4) from the coded data memory means 1-5 to the coding and decoding means 1-2 as shown in step 10-8, and the control means 1-1 transfers the image data decoded by the coding and decoding means 1-2 to the image data memory means 1-4 as shown in step 10-9. The control means 1-1 then reads the control information stored in the coded data memory means 1-5 and checks the presence of the rest of the coded data, and if coded data for another color parameter remains, the above described steps 10-2 to 10-10 are repeated until the control information CodeCt1E (2-3) has been found.

Compressed data having the structure shown in FIG. 6 is thus decoded in the above described decoding steps.

EMBODIMENT 2

(CODING PROCESS OF EMBODIMENT 2)

Figure 4:
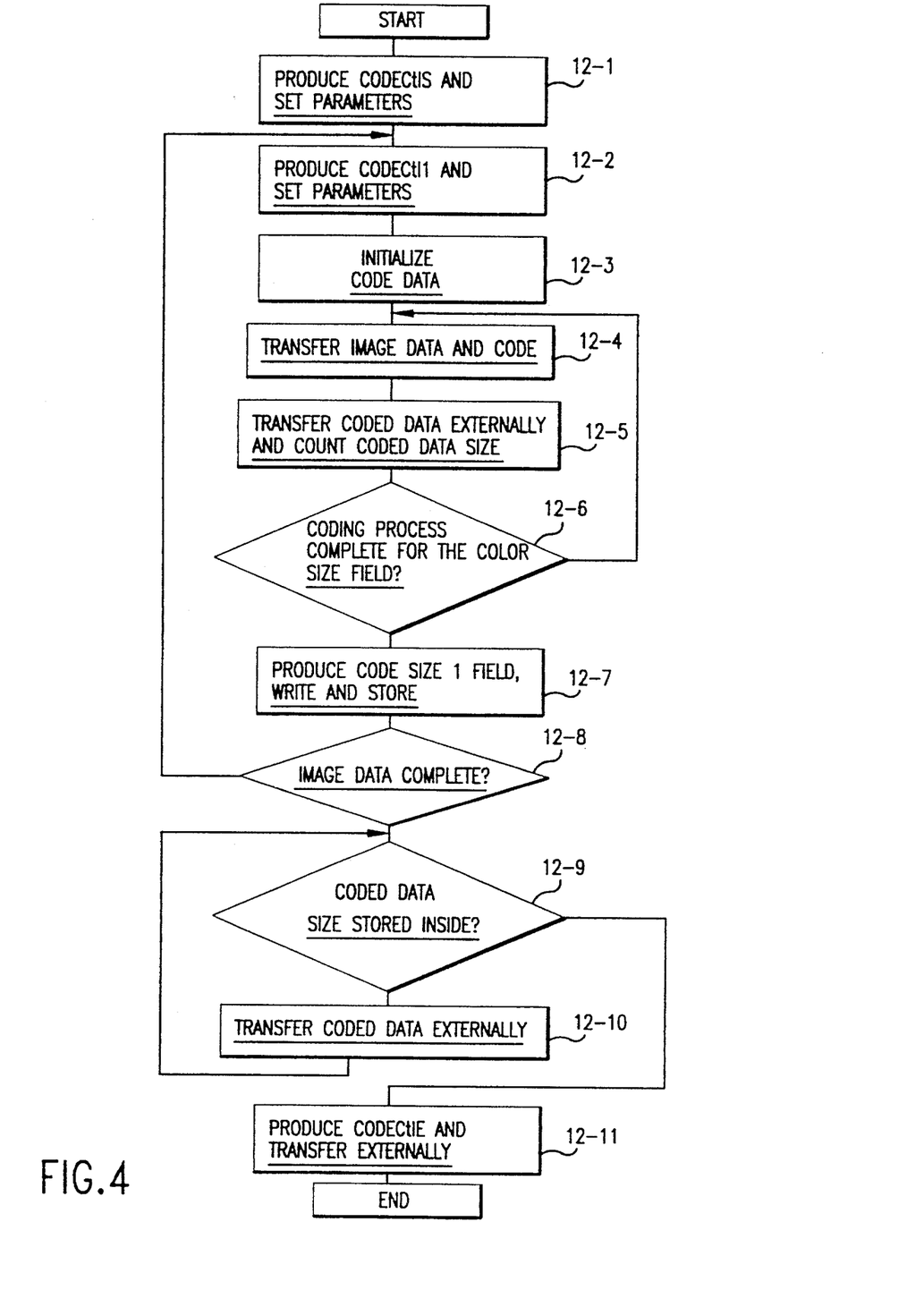
FIG. 4 shows coding steps described in Embodiment 2.
Figure 9:
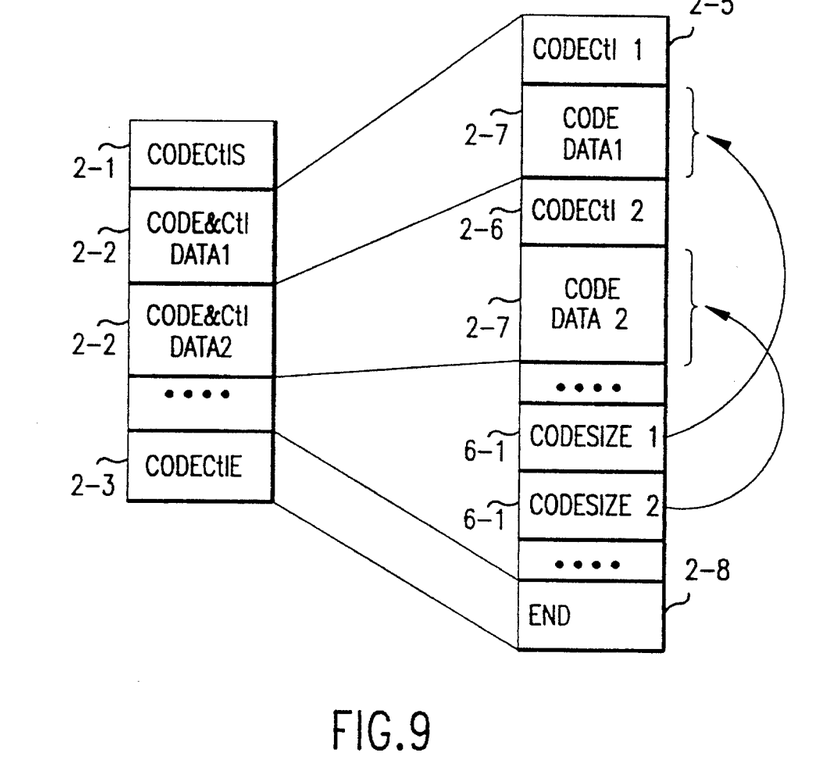
FIG. 9 shows the structure of the coded data of Embodiment 2.

For another example of the present invention, the process for producing the data structure wherein control information showing the size of the coded data is provided after the coded data as shown in FIG. 9 is now described based on the coding steps shown in FIG. 4.

The control means 1-1 produces start control information CodeCt1S (2-1), expands it in the coded data memory means 1-5 and sets the parameters necessary for the coding process for the coding and decoding means 1-2 as shown in step 12-1. Further, the control means 1-1 produces the control information CodeCt11 (2-6) included in the compressed data Code&Ct1Data1 (2-2) for the color parameter to be coded and expands it in the coded data memory means 1-5. Meanwhile, the control means 1-1 sets the necessary parameters for the coding and decoding means 1-2 as shown in step 12-2. The control means 1-1 then initializes the coded data size held by the coded data size counter 1-3 as shown in step 12-3.

The control means 1-1 then transfers the image data stored in the image data memory means 1-4 to the coding and decoding means 1-2. The coding and decoding means 1-2 applies coding process to the transferred image data as shown in step 12-4. The control means 1-1 transfers the coded data produced in the coding process to the external device connection means 1-6. Here, the coded data size counter counts the size of the transferred coded data as shown in step 12-5. The above described steps 12-4 to 12-6 are repeated until the coding process of image data represented in the color parameter is completed as shown in step 12-6.

When the coding process of image data represented in the color parameter is completed, the control means 1-1 produces the field of the coded data size information CodeSize1 (6-1) shown in FIG. 7, obtains the coded data size held by the coded data size counter 1-3 and writes it in the coded data size field (8-2). Further, the control means 1-1 stores the coded data size information CodeSize1 (6-1) inside as shown in step 12-7. The above described steps 12-2 to 12-8 are repeated until coding of the whole image data is completed as shown in step 12-8.

When coding process of whole image data is completed, the control means 1-1 transfers all the coded data size information CodeSize1, CodeSize2 and so forth (6-1), which are held inside, to the external device connection means 1-6 in the same order as the coded data for each color parameter as shown in step 12-10. The control means 1-1 then produces end control information CodeCt1E (2-3) for the compressed data and transfers it to the external device connection means 1-6 as shown in step 12-11, and thus coding process is completed.

Compressed data having the structure shown in FIG. 9 is thus produced in the above described coding steps.

(DECODING PROCESS OF EMBODIMENT 2)

Figure 5:
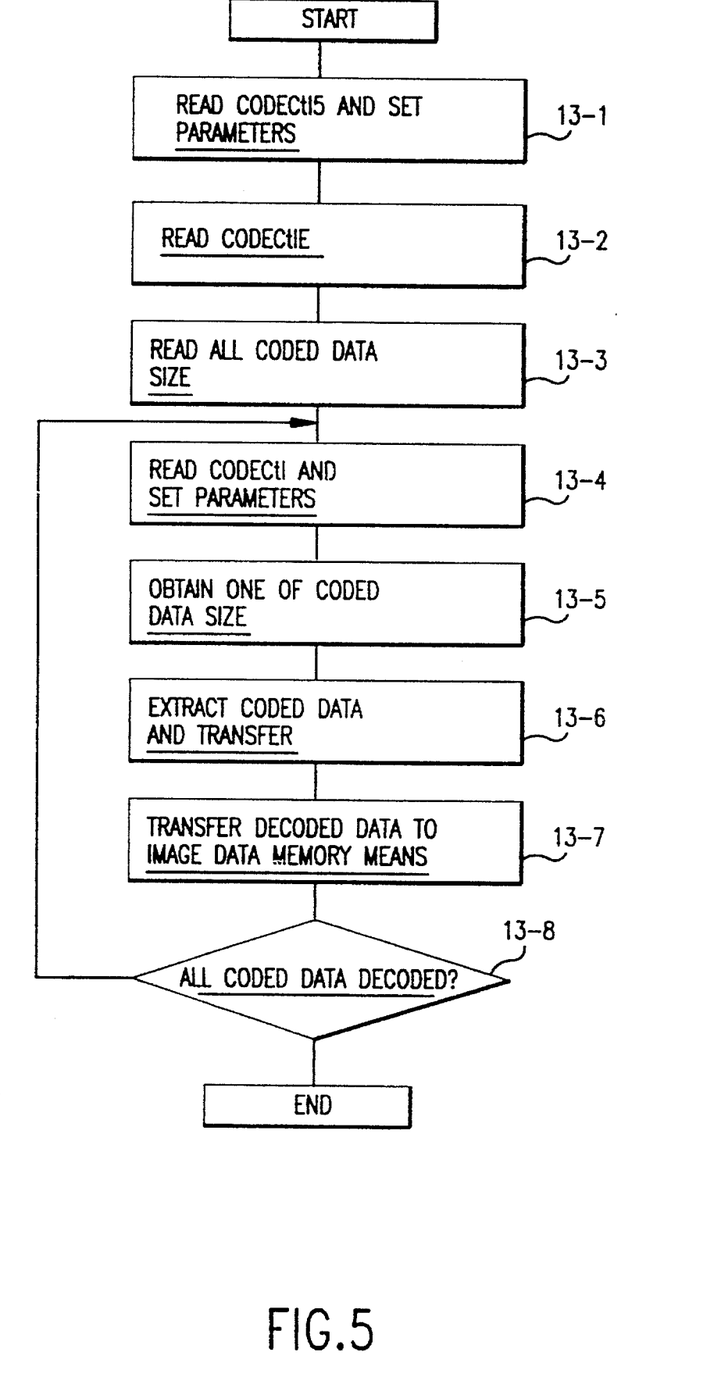
FIG. 5 shows decoding steps described in Embodiment 2.

The decoding steps of the compressed data having the structure shown in FIG. 9 is now described based on FIG. 5. The control means 1-1 expands the whole compressed data obtained from the external device connection means 1-6 in the coded data memory means 1-5, reads the start control information CodeCt1S (2-1) stored in the coded data memory means 1-5 and sets the parameters necessary for the decoding process for the coding and decoding means 1-2 as shown in step 13-1. Meanwhile, the number of the coded data size information is determined based on the number of parameters included in the whole compressed data and so forth. The control means 1-1 then reads the end control information CodeCt1E (2-3) of a predetermined size from the end of the compressed data stored in the coded data memory means 1-5 as shown in step 13-2.

Further, the control means 1-1 reads all the coded data size information CodeSize1, CodeSize2 and so forth (6-1) for each color parameter present immediately before the end control information CodeCt1E (2-3) based on the number and size of the coded data size information obtained by the process shown in step 13-1 and stores them inside as shown in step 13-3. The control means 1-1 then reads CodeCt11 (2-6) included in the compressed data for the color parameter stored in the coded data memory means 1-5 and sets the necessary parameters for the coding and decoding means 1-2 as shown in step 13-4.

As shown in step 13-5, the control means 1-1 obtains the size of the coded data CodeData1 (2-7) from the coded data size information CodeSize1 (6-1) corresponding to the coded data CodeData1 (2-7) for the color parameter among the coded data size information read in the process shown in step 13-3.

The control means 1-1 then extracts the coded data CodeData1 (2-7) from the coded data memory means 1-5 based on the size of the coded data and transfers it to the coding and decoding means 1-2 as shown in step 13-6, and it transfers the image data decoded by the coding and decoding means 1-2 to the image data memory means 1-4 as shown in step 13-7. The above described steps 13-4 to 13-8 are repeated until all of the coded data for the color parameters has been decoded as shown in step 13-8.

Compressed data having the structure shown in FIG. 9 is thus decoded based on the above described decoding steps.

Conventionally, in order to add coded data size information to the coded data obtained by coding the image of a predetermined size (Here, suppose the coded data size is n bytes), it is necessary to provide the combination of coded data memory means 1-5 having a memory capacity of at least n bytes and means for ensuring that the size of the coded data does not exceed the memory capacity or the combination of coded data memory means 1-5 having a memory capacity of at least n bytes and secondary memory means for storing the coded data temporarily.

In embodiment 1, however, as the coded data is divided into a predetermined size (here, the predetermined size is m bytes, and m is supposed to be much smaller than n) and coded data size information is provided for each of the corresponding coded blocks, it is possible to specify the memory capacity of the coded data memory means 1-5 to be the predetermined size obtained by m plus the size of coded data size information, by which the memory capacity of the primary memory means for variable-length coded data, that is, coded data memory means 1-5, can be reduced, and both of the means for ensuring the coded data size and secondary memory means are unnecessary. Further, the unit of processing can be determined freely by reducing the size of division.

Moreover in Embodiment 2, by providing coded data size information after all the coded data, it is possible to provide the same effects when coding as described above.

If coded data does not include coded data size information, comparison processes for n times are necessary when decoding in order to distinguish control information from coded data, but with the present invention, this comparison processes for n times can be omitted entirely, by which high speed processing is possible.

The above described m, which corresponds to buffer size and can be specified freely, is, for example, 256 k bytes. As n is the coded data size after compression, it is variable, and if an image of A4 size and having an image density of 400 spi is compressed by JPEG method, the value of n is generally 1.2 to 4.8 M bytes. Therefore, the comparison processes for n times is unnecessary and the process speed can be improved greatly.

What is claimed is:

1. An image coding and decoding apparatus comprising: image data memory means for storing image data temporarily; coding and decoding means for carrying out a coding process to obtain coded data by coding the image data and a decoding process to obtain image data by decoding the coded data; coded data memory means for storing the coded data and control information necessary for transferring and controlling the coded data when decoding temporarily; external device connection means for connecting said image coding and decoding apparatus with external devices which actually carry out transferring and storing of data; a coded data size counter for counting the size of the coded data produced by said coding and decoding means; and control means for transferring data among said coding and decoding means, said image data memory means, said coded data memory means and said external device connection means, producing and parsing said control information for the coded data, adding said control information to the coded data, extracting said control information from the coded data and sending parameters necessary for the behavior of said coding and decoding means, and wherein said control means comprises coded data dividing means for dividing the coded data produced by said coding and decoding means into a predetermined size to produce divided coded data blocks and coded data size information addition means for appending to each of the divided coded data blocks, when coding the image data, control information showing the data size of the divided coded data blocks as said control information.

2. The image coding and decoding apparatus described in claim 1, wherein said coded data size information addition means writes, in said control information showing the size of the coded data blocks, a size or an identifier showing the size for a coded data block of a predetermined size and a size for a coded data block whose size does not reach a predetermined value.

3. The image coding and decoding apparatus described in claim 1, wherein said coded data size information addition means writes in said control information showing the size of the coded data blocks an identifier to determine whether the divided coded data block is the last block or not.

4. The image coding and decoding apparatus described in claim 1, wherein the value of a coded data block size which is the basis for coded data division is obtained based on the memory capacity of said coded data memory means for storing the coded data temporarily.

* * * * *